United States Patent
Hamada

(10) Patent No.: US 7,039,285 B2
(45) Date of Patent: May 2, 2006

(54) METHOD OF MANUFACTURING PHOTONIC CRYSTAL, MASK, METHOD OF MANUFACTURING MASK AND METHOD OF MANUFACTURING OPTICAL DEVICE

(75) Inventor: Hidenobu Hamada, Amagasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 132 days.

(21) Appl. No.: 10/319,928

(22) Filed: Dec. 12, 2002

(65) Prior Publication Data

US 2003/0180023 A1    Sep. 25, 2003

(30) Foreign Application Priority Data

Dec. 13, 2001 (JP) .............................. 2001-380010

(51) Int. Cl.
*G02B 6/22* (2006.01)

(52) U.S. Cl. ..................... 385/129; 385/130; 385/1

(58) Field of Classification Search ........ 385/123–130, 385/1

See application file for complete search history.

(56) References Cited

U.S. PATENT DOCUMENTS

| 4,021,674 | A | * | 5/1977 | Koops .................... 250/492.2 |
| 4,562,632 | A | * | 1/1986 | Parchet et al. ............. 29/281.1 |
| 5,008,702 | A | * | 4/1991 | Tanaka et al. .............. 355/52 |
| 5,389,943 | A | * | 2/1995 | Brommer et al. .......... 343/909 |
| 6,015,976 | A | * | 1/2000 | Hatakeyama et al. .. 250/492.23 |
| 6,028,317 | A | * | 2/2000 | Murooka et al. ...... 250/492.23 |
| 6,075,915 | A | * | 6/2000 | Koops et al. .............. 385/125 |
| 6,093,246 | A | * | 7/2000 | Lin et al. .................... 1/1 |
| 6,317,554 | B1 | * | 11/2001 | Kosaka et al. ............ 385/132 |
| 6,542,682 | B1 | * | 4/2003 | Cotteverte et al. ......... 385/125 |
| 6,785,454 | B1 | * | 8/2004 | Abe .......................... 385/123 |
| 2001/0006413 | A1 | * | 7/2001 | Burghoorn ................. 355/53 |
| 2001/0026668 | A1 | * | 10/2001 | Yamada ..................... 385/125 |
| 2002/0146193 | A1 | | 10/2002 | Hamada |

FOREIGN PATENT DOCUMENTS

| EP | 0 509 342 A2 | 10/1992 |
| JP | 2000-258650 | 9/2000 |
| JP | 2001-105447 | 4/2001 |

OTHER PUBLICATIONS

Chinese Official Action dated Feb. 18, 2005, for Application No. 02156170.2 with English translation.

* cited by examiner

*Primary Examiner*—Ellen E. Kim
(74) *Attorney, Agent, or Firm*—RatnerPrestia

(57) ABSTRACT

A method of manufacturing a photonic crystal has the step of:
  a first step of providing a predetermined film for which a photonic crystal is manufactured; and
  a second step of irradiating predetermined particles or electromagnetic waves onto a mask having passage sections arrayed based on a cyclic structure predetermined for each region and a mask substrate to hold the passage sections,
wherein the mask is constructed so that (a) when the particles are irradiated in the second step, the particles substantially pass through only the passage sections or (b) when the electromagnetic waves are irradiated in the second step, an energy density difference is produced on the film due to a diffraction effect based on the cyclic structure,
the direction of the array corresponds to the direction of a fundamental grating vector of the photonic crystal, and
the direction corresponding to the direction of at least one the fundamental grating vector in the each region is consistent throughout all the regions.

16 Claims, 16 Drawing Sheets enlarged view of kth mold section

Fig. 10 (A) PRIOR ART
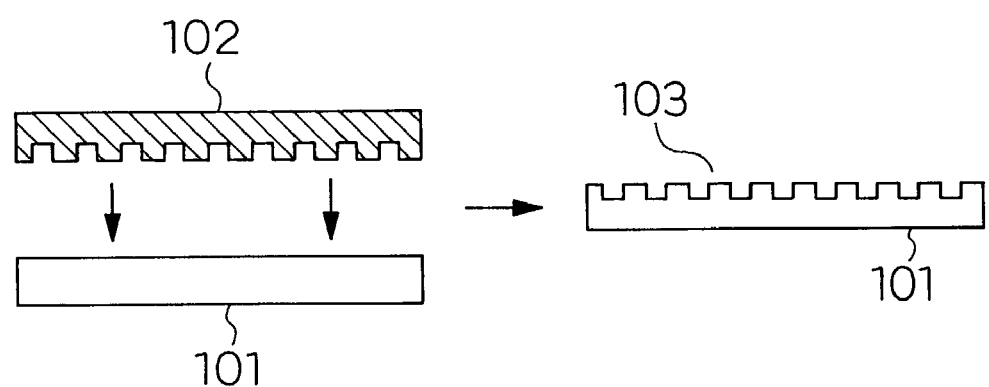
Fig. 10 (B) PRIOR ART
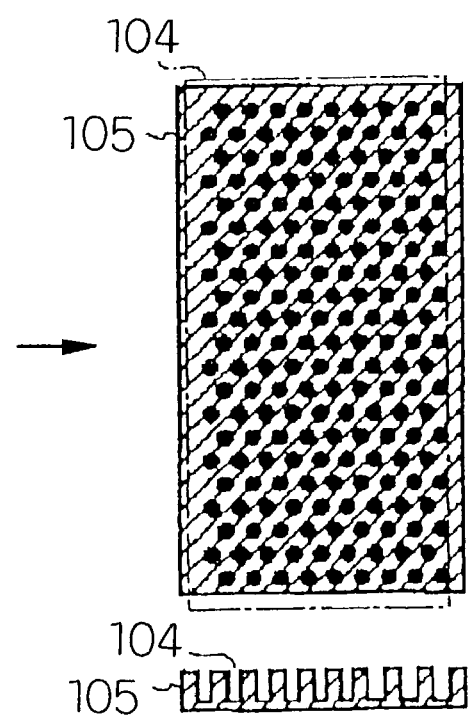

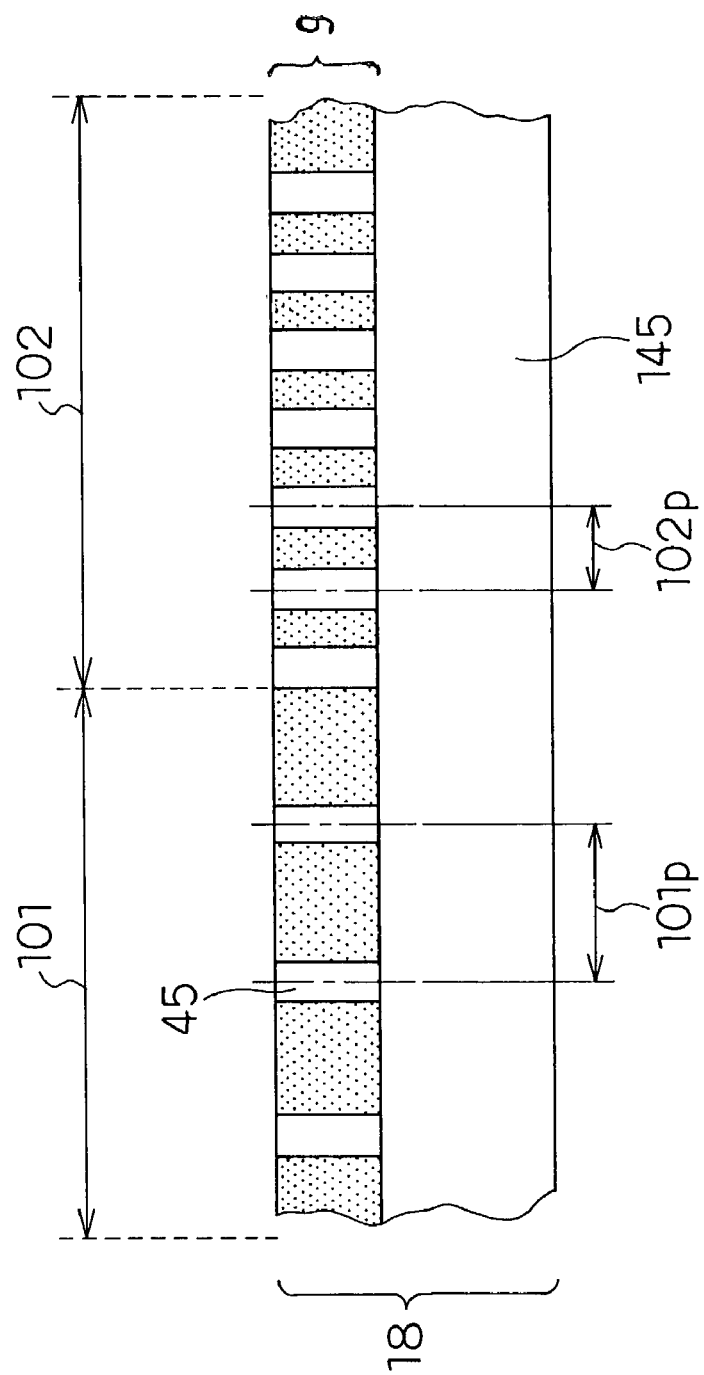

METHOD OF MANUFACTURING PHOTONIC CRYSTAL, MASK, METHOD OF MANUFACTURING MASK AND METHOD OF MANUFACTURING OPTICAL DEVICE

BACKGROUND OF THE INVENTION

1. Field of the Invention

The present invention relates to a photonic crystal film used for an optical path divider for optical communications and WDM transmission/reception module, and so on, a method of manufacturing a photonic crystal, a mask, a method of manufacturing a mask, an optical device and a method of manufacturing an optical device.

2. Description of the Related Art

First, using a mask with a single cyclic structure allows a photonic crystal of holes to be easily realized on the polymer thin film. Furthermore, the same applies to a case where a mask having a single cyclic structure is used even when a material other than polymer is used as the photonic crystal material.

First, a method of manufacturing a photonic crystal having a single cyclic structure, which is a conventional example of a photonic crystal using a mold having a single cyclic structure will be shown in FIG. 10 (see Japanese Patent Laid-Open No. 2000-258650), the entire disclosure of which is incorporated herein by reference in its entirety.

A substrate 101 is pressed using a mold 102 to have a convexo-concave pattern and this substrate is subjected to anode oxidization in oxalic acid, whereby the substrate is transformed into a metal oxide thin film 105 having a cyclic nano-hole structure 104.

Thus, a single cyclic structure can be easily transferred to an object by pressing a mold having a single cyclic structure.

By the way, a method of manufacturing a photonic crystal having a single cyclic structure, which is this inventor's own invention described in Japanese patent Application No. 2001-105447 for a photonic crystal using a mask having a single cyclic structure will be shown in FIG. 9(A) and FIG. 9(B). The entire disclosure of Japanese Patent Application No.2001-105447 is incorporated herein by reference in its entirety. Since the inventor's own Japanese Patent Application No.2001-105447 was not published at the Priority Date(Dec. 13, 2001) of this application, the invention described in Japanese Patent Application No.2001-105447 is not prior art.

When a slab waveguide made up of a polymer thin film 91 formed on a glass substrate 90 is prepared (see FIG. 9(A), a mask 92 having the same single cyclic structure as a conventional photonic crystal structure is placed on the polymer thin film 91 of the slab waveguide, and then an ion beam 95 is injected, trackings 93 are formed by ions 94 injected at positions of windows (through hole 96 ) of the mask on the polymer thin film 91 (see FIG. 9(B)). These trackings 93 are changed to holes through alkali treatment and a cyclic structure of holes having the same single cyclic structure as that of the mask on the polymer thin film 91 is formed.

Thus, using a mask with a single cyclic structure allows a photonic crystal of holes to be easily realized on the polymer thin film. Furthermore, the same applies to a case where a mask having a single cyclic structure is used even when a material other than polymer is used as the photonic crystal material.

SUMMARY OF THE INVENTION

When the photonic crystal is allowed to act on only a specific wavelength using a wavelength dispersion function of a photonic crystal of a WDM (Wavelength Division Multiplexer), etc., only one photonic crystal having one type of cyclic structure needs to be used. However, when the photonic crystal is allowed to act on a plurality of types of wavelengths, the same number of photonic crystals as types of wavelength needs to be used. In this case, the cyclic structure of the photonic crystal basically requires the same number of types as types of wavelength. Thus, there is a problem that all optical axes of photonic crystals having different cyclic structures should be aligned and connected in series. Optical axis alignment is also required when a plurality of photonic crystals is connected via optical waveguides in the like manner.

When a photonic crystal is used which acts on only a specific wavelength as in the above-described example, the optical axes of photonic crystals corresponding to the respective wavelengths need to be aligned and there is a problem that it is unavoidable to increase the number of components and increase the number of assembly steps including optical axis alignment.

In view of the problems of the photonic crystal having a single crystal structure which acts on only a specific wavelength, it is an object of the present invention to provide an optical device to which a photonic crystal capable of realizing a WDM optical filter, ADD-DROP and a WDM divider which separates power of wavelengths of two or more waves, a method of manufacturing a photonic crystal, a mask, a method of manufacturing a mask, a method of manufacturing an optical device, an optical device and a photonic crystal film.

One aspect of the present invention is a method of manufacturing a photonic crystal comprising the steps of:

a first step of providing a predetermined film for which a photonic crystal is manufactured; and a second step of irradiating predetermined particles or electromagnetic waves onto a mask having passage sections arrayed based on a cyclic structure predetermined for each region and a mask substrate to hold said passage sections, wherein said mask is constructed so that (a) when said particles are irradiated in said second step, said particles substantially pass through only said passage sections or (b) when said electromagnetic waves are irradiated in said second step, an energy density difference is produced on said film due to a diffraction effect based on said cyclic structure, the direction of said array corresponds to the direction of a fundamental grating vector of said photonic crystal, and the direction corresponding to the direction of at least one said fundamental grating vector in said each region is consistent throughout all said regions.

Another aspect of the present invention is the method of manufacturing a photonic crystal, wherein said passage sections are constructed of holes differing from said one region to another in at least one of cycle, size or shape.

Still another aspect of the present invention is the method of manufacturing a photonic crystal, wherein said film is a thin film for an optical waveguide, said second step is a step of using charged particles as said particles, and in said second step, said cyclic structure is transferred by injecting said charged particles that have passed through said passage sections into said thin film.

Yet still another aspect of the present invention is the method of manufacturing a photonic crystal, wherein said second step is a step of irradiating said electromagnetic waves, said film is a thin film for an optical waveguide, a refractive index of said passage sections is different from a refractive index of said mask substrate, and said energy density difference is produced as an intensity distribution of said energy density, whereby said cyclic structure is transferred to said thin film.

Still yet another aspect of the present invention is the method of manufacturing a photonic crystal, wherein said array in said each region is a two-dimensional array corresponding to a two-dimensional fundamental grating vector of said photonic crystal to be manufactured for said film and one of angles formed by the two directions of said array is 60 to 90°, and said passage sections differ from said one region to another in at least one of a grating constant, size or shape.

A further aspect of the present invention is the method of manufacturing a photonic crystal, wherein said film is an optical waveguide film, and said method further comprises a third step of inserting a spacer between said mask and said waveguide film, said spacer for keeping a space between said mask and said optical waveguide film constant and having a window for exposing part of said mask and part of said optical waveguide film.

A still further aspect of the present invention is the method of manufacturing a photonic crystal, wherein said spacer is integrated with said mask and said mask structure is transferred to a plurality of said optical waveguide films one after another by moving said integrated spacer.

A yet further aspect of the present invention is the method of manufacturing a photonic crystal, wherein the length of said optical waveguide film in the optical waveguide direction is shorter than the length of said mask window and the width of said optical waveguide film in a direction perpendicular to said optical waveguide direction within the plane of said optical waveguide film is greater than the width of said mask window.

A still yet further aspect of the present invention is the method of manufacturing a photonic crystal, wherein size of the cross-section of said each passage section is such that a plurality of said charged particles can pass, the size of said passage section is smaller than size of the cross-section of a part which makes up the cyclic structure to be formed on said optical waveguide film, whose refractive index should be different from that of said optical waveguide film.

An additional aspect of the present invention is the method of manufacturing a photonic crystal, wherein the size of said cross-section of said passage section is ¼ of or greater than the size of the part which makes up the cyclic structure to be formed on said optical waveguide film, having a refractive index different from that of said optical waveguide film.

The 10th invention of the present invention is the method of manufacturing a photonic crystal according to the 9th invention, wherein the size of said cross-section of said passage section is ¼ of or greater than the size of the part which makes up the cyclic structure to be formed on said optical waveguide film, having a refractive index different from that of said optical waveguide film.

A still additional aspect of the present invention is the method of manufacturing a photonic crystal, further comprising a step of soaking said optical waveguide film in an alkali aqueous solution after injecting charged particles in said optical waveguide, wherein said optical waveguide film is soaked in said alkali aqueous solution until the size of said each part which makes up said cyclic structure after the material change of said charged particle injected portion by the alkali aqueous solution substantially reaches the size of each part which makes up said cyclic structure to be formed on said optical wavelength film.

A yet additional aspect of the present invention is the method of manufacturing a photonic crystal, wherein a grating constant of said each cyclic structure of said mask having a composite cyclic structure has a size 0.4 to 0.6 times the wavelength specific to said each cyclic structure.

A still yet additional aspect of the present invention is a method of manufacturing an optical device using:

a substrate having at least one through-structured V-groove in an optical axis direction;

an optical waveguide film including a photonic crystal placed in such a way as to contact a plane with the V-groove of said substrate;

at least one optical fiber on an incident light side fixed by means of said V-groove to said incident light side of said waveguide film provided with the incident light side and outgoing light side within a plane parallel to said substrate including the optical axis; and at least one optical fiber on the outgoing light side fixed to said outgoing light side, wherein said photonic crystal is manufactured by irradiating predetermined particles or electromagnetic waves onto a mask having passage sections arrayed based on a cyclic structure predetermined for each region and a mask substrate to hold said passage sections, the direction of said array corresponds to the direction of a fundamental grating vector of said photonic crystal, and the direction corresponding to the direction of at least one said fundamental grating vectors in each said region is consistent throughout all said regions.

A supplementary aspect of the present invention is the method of manufacturing an optical device, wherein a spacing of said V-groove is determined in proportion to the length of said region of said photonic crystal.

A still supplementary aspect of the present invention is the method of manufacturing an optical device, wherein the grating constant of said photonic crystal has a size 0.4 to 0.6 times the wavelength specific to a two-dimensional photonic crystal.

A yet supplementary aspect of the present invention is the method of manufacturing an optical device, wherein said photonic crystal is constructed of holes formed over a range from a thin film core section to a clad substrate making up said optical waveguide film and arrayed two-dimensionally and cyclically.

A still yet supplementary aspect of the present invention is a mask comprising:

passage sections arrayed based on a cyclic structure predetermined for each region; and a mask substrate to hold said passage sections, wherein said mask is constructed so that (a) when particles are irradiated, said particles substantially pass through only said passage sections or (b) when electromagnetic waves are irradiated, an energy density difference is produced on a predetermined film due to a diffraction effect based on said cyclic structure, and said predetermined cyclic structure differs between at least said neighboring regions of said mask substrate.

Another aspect of the present invention is the mask according to the 17th invention, wherein said array of said passage sections in said each region is an array based on a two-dimensional cyclic structure, the direction of said array corresponds to two directions of the two-dimensional fundamental grating vector of the photonic crystal to be manufactured on a predetermined film using said mask, and the direction corresponding to the direction of said at least one fundamental grating vector in said region is consistent throughout all said regions.

Still another aspect of the present invention is the mask wherein said passage sections are different from said one region to another in at least one of cycle, size or shape.

Yet still another aspect of the present invention is the mask, wherein said particles are charged particles and said passage sections are through holes through which said charged particles can pass.

Still yet another aspect of the present invention is the mask, wherein said mask substrate is irradiated with electromagnetic waves and the refractive index of said passage sections is different from the refractive index of said mask substrate.

A further aspect of the present invention is a method of manufacturing a mask comprising:

a step (a) of providing a mask substrate having a predetermined refractive index;

a step (b) of injecting ions at a plurality of positions on said mask substrate or irradiating electromagnetic waves so that energy density differences due to interference of refracted waves are produced at a plurality of positions on said mask substrate and thereby changing the refractive index of said mask substrate in said positions, wherein said positions are determined based on a rule predetermined for each region on said mask substrate, and said predetermined standard varies between at least said neighboring regions on said mask substrate.

A still further aspect of the present invention is a method of manufacturing a mask comprising:

a step (a) of providing a mask substrate having a predetermined refractive index;

a step (b) of forming through holes at a plurality of positions on said mask substrate; and a step (c) of filling said through holes with a material whose refractive index is different from said refractive index of said mask substrate, wherein the positions of said through holes are determined based on a rule predetermined for each region on said mask substrate, and said predetermined rule varies between at least said neighboring regions on said mask substrate.

A yet further aspect of the present invention is a method of manufacturing a mask comprising:

a step (a) of supplying a mask substrate for substantially restricting passage of predetermined particles; and a step (b) of applying dry etching to said mask substrate at a plurality of positions using ion beams or electron beams and forming a plurality of through holes, wherein said positions are determined based on a rule predetermined for each region on said mask substrate, and said predetermined rule varies between at least said neighboring regions on said mask substrate.

A still yet further aspect of the present invention is a method of manufacturing a mask comprising:

a step (a) of providing a mask substrate for substantially restricting passage of predetermined particles; and a step (b) of forming depressions or through holes on said mask substrate using a mold means having protrusions at a plurality of positions, wherein said positions are determined based on a rule predetermined for each region on said mask substrate, and said predetermined rule varies between at least said neighboring regions on said mask substrate.

An additional aspect of the present invention is the method of manufacturing a mask, wherein said step (b) is a step of forming said depressions on said mask substrate and said method further comprises a step (c) of applying anode oxidation to said depressions to obtain through holes.

A still additional aspect of the present invention is the method of manufacturing a mask, wherein said protrusions have cyclic structures corresponding to the respective regions of said mask substrate, said cyclic structure is a two-dimensional array based on a two-dimensional fundamental grating vector and one of angles formed by said two fundamental vectors is 60 to 90°, and said protrusions differ from said one cyclic structure to another in at least one of grating constant, size or shape.

A yet additional aspect of the present invention is the method of manufacturing a mask, wherein said grating constant of said each cyclic structure has a size 0.4 to 0.6 times the wavelength specific to said each cyclic structure.

A still yet additional aspect of the present invention is an optical device comprising:

a substrate having at least one V-groove in an optical axis direction;

an optical waveguide film including a photonic crystal film placed in so as to contact the plane with the V-groove of said substrate;

at least one optical fiber on an incident light side fixed by means of said V-groove to said incident light side of said waveguide film provided with the incident light side and outgoing light side within a plane parallel to said substrate including the optical axis; and at least one optical fiber on the outgoing light side fixed to said outgoing light side, wherein said photonic crystal film is provided with positions with different refractive indices based on a cyclic array predetermined for each region and the direction of at least one of said cyclic arrays matches the direction of said optical axis in all said regions.

A supplementary aspect of the present invention is a photonic crystal film comprising:

a photonic crystal film body having a first refractive index; and a portion with a refractive index different from said first refractive index which exists based on a cyclic array predetermined for each region of said photonic crystal film, wherein the direction of at least one of said cyclic arrays is aligned with optical axis direction in all said regions.

Thus, by using the above described mask with a plurality of cyclic structures and transferring the mask structure to the thin film core section of the slab waveguide, a photonic crystal is obtained whose thin film core section has a plurality of cyclic structures. This allows photonic crystals of various cyclic structures corresponding to a plurality of wavelengths such as a WDM, etc. to be formed in the thin film core.

BRIEF DESCRIPTION OF THE DRAWINGS

FIGS. 10(A) and 10(B) illustrate an example of manufacturing a conventional single cycle photonic crystal using a mold;

FIG. 11 is a schematic cross-sectional view to give an overview of a cyclic structure of the photonic crystal according to the first embodiment;

Description of Symbols

| | |
|---|---|
| 1 | Mask substrate |
| 2 | Through hole |
| 3 | kth two-dimensional cyclic structure |
| 4 | kth mask section |
| 5 | First fundamental grating vector |
| 6 | First mask section |
| 7 | nth mask section |
| 8 | Mask |
| 9 | Thin film core |
| 10 | Clad substrate |
| 11 | Ion beam |
| 12 | Crystal grating internal angle |
| 13 | Hole radius |
| 14 | Grating constant |
| 20 | Thin film core |
| 21 | Clad substrate |
| 22 | Mask |

-continued

Description of Symbols

| | |
|---|---|
| 23 | Mask holder |
| 24 | Window |
| 25 | Optical axis |
| 26 | Ion beam |
| 30 | Tracking |
| 31 | Mask hole |
| 45 | Desired hole shape of polymer thin film |
| 33 | Growing hole |
| 34 | NaOH aqueous solution |
| 35 | Completed hole |
| 40 | Mold substrate |
| 41 | Protrusion |
| 42 | kth two-dimensional cyclic structure |
| 43 | kth mold section |
| 44 | First fundamental grating vector |
| 245 | First mold section |
| 46 | nth mold section |
| 47 | Mold |
| 48 | Mask substrate |
| 49 | Crystal grating internal angle |
| 50 | Grating constant |
| 51 | Diffraction grating |
| 52 | Thin film core |
| 53 | Clad substrate |
| 54 | Laser |
| 55 | Diffracted light |
| 60 | Thin film core |
| 61 | Clad substrate |
| 62 | Slab type photonic crystal |
| 63 | Input side optical fiber |
| 64 | First output side optical fiber |
| 65 | Second output side optical fiber |
| 66 | First V-groove |
| 67 | Second V-groove |
| 68 | V-grooved substrate |
| 69 | Connection section |
| 80 | Thin film core |
| 81 | Clad substrate |
| 82 | Slab type photonic crystal waveguide |
| 83 | Hole |
| 90 | Glass substrate |
| 91 | Polymer thin film |
| 92 | Single cycle mask |
| 93 | Tracking |
| 94 | Injected ion |
| 95 | Ion beam |
| 96 | Hole |
| 101 | Substrate |
| 102 | Mold |
| 103 | Convexo-concave pattern |
| 104 | Cyclic nano-hole structure |
| 105 | Metal oxide thin film |

DETAILED DESCRIPTION OF THE PREFERRED EMBODIMENTS

With reference now to the attached drawings, embodiments of the present invention will be explained below.

First Embodiment

Here, an embodiment of a method of manufacturing a photonic crystal of the present invention will be explained with reference to the attached drawings and at the same time an example of a photonic crystal manufactured thereby will be explained.

Figure 1:
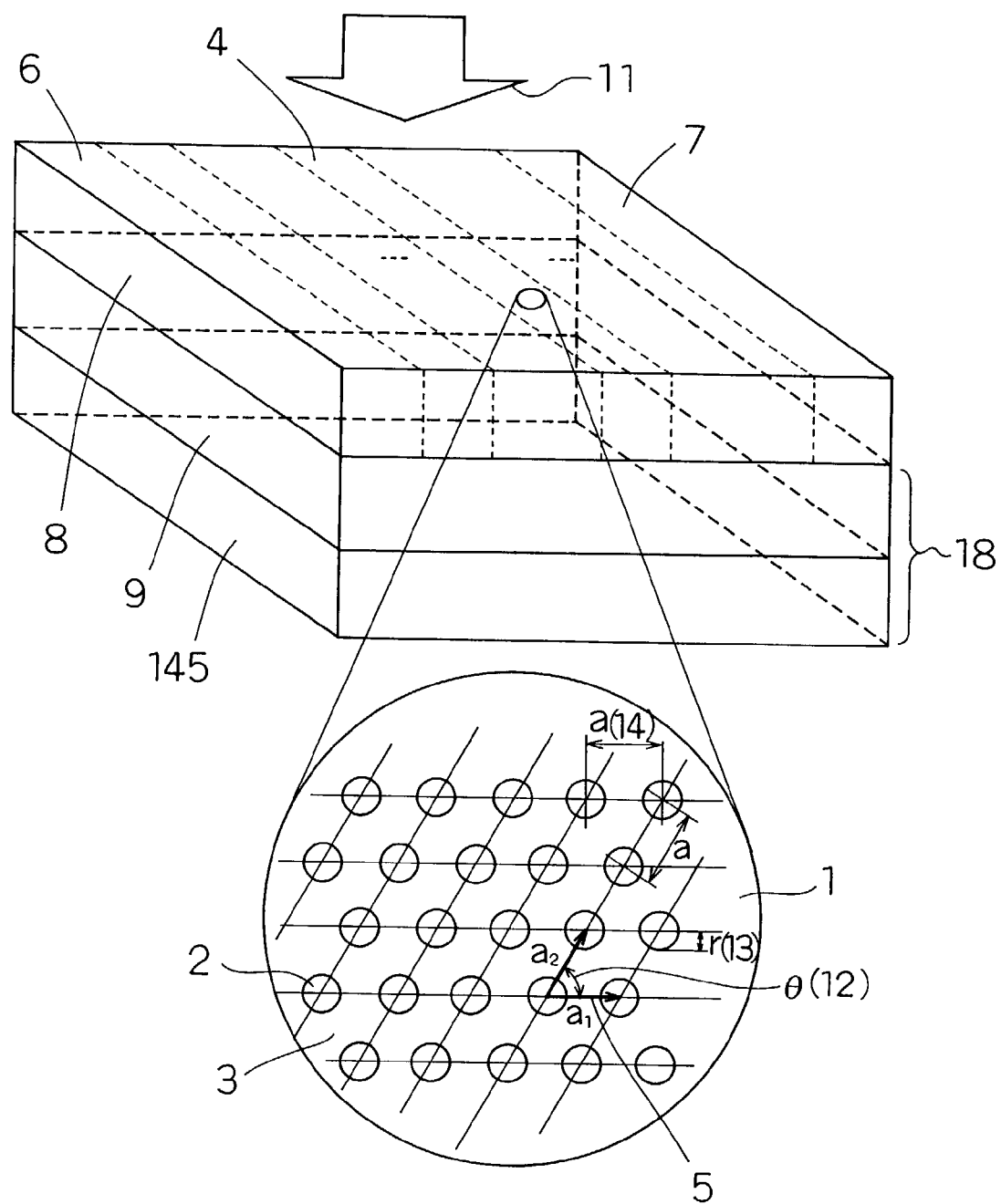
FIG. 1 is a schematic view of a photonic crystal having a multi-cyclic structure which is a first embodiment of the present invention.

FIG. 1 illustrates an overview of a method of manufacturing a photonic crystal having a plurality of types of cyclic structure and a mask configuration. Furthermore, FIG. 11 is a schematic cross-sectional view to give an overview of a cyclic structure of the photonic crystal according to this embodiment.

As shown in FIG. 1, a mask 8 used to create this photonic crystal is constructed of a plurality of through holes 2 and a mask substrate 1 to hold those through holes 2. By the way, the through holes 2 are examples of passage sections of the present invention.

The mask substrate 1 is constructed of a first mask section 6 to nth mask section 7 integrated as one body. On the other hand, the through holes 2 allow a predetermined ion beam 11 to pass and differ from one region to another of the first mask section 6 to nth mask section 7 in their array, size and shape, etc. By the way, the predetermined ion beam 11 is an example of predetermined particles of the present invention.

That is, the mask substrate 1 is a substrate that has the functions of holding the through holes 2 arrayed based on a predetermined cyclic structure for each region of the first mask section 6 to nth mask section 7 and blocking the passage of the ion beam 11 in places other than the through holes 2.

Here, the configuration of the mask 8 of this embodiment will be explained in more detail. A mask 8 is constituted by arranging a plurality of mask sections. That is, the mask 8 has an array of n kth (k=1, 2, . . . , n) mask section 4 from the first mask section 6 to nth mask section 7 in the direction of a common first fundamental grating vector 5 in each mask section, with each kth mask section having two-dimensional cyclic structure 3 (FIG. 1 shows an enlarged view of part of the kth mask section 4) with the through holes 2 arrayed two-dimensionally and cyclically.

Then, the mask 8 constitutes a composite cyclic structure which is different from the two-dimensional structure of the above described mask section in the cycle and shape of the through holes 2.

By the way, a grating constant $a_k$ and hole diameter (radius) $r_k$ of the kth mask section 4 have a linear relationship with light wavelength $f_k$ corresponding to the kth mask section 4 shown in the following expression:

$$a_k = Ca \times f_k \text{ (Ca: constant)}$$

$$r_k = Cr \times f_k \text{ (Cr: constant)}$$

Then, the method of manufacturing the photonic crystal of this embodiment will be explained.

First, a slab type waveguide 18 having a two-layer structure of the thin film core 9 and clad substrate 145 (corresponding to the first step of the present invention) is prepared.

Then, as shown in FIG. 1, the mask 8 is overlaid on the thin film core 9 of the slab type waveguide 18 as shown in FIG. 1 (corresponding to the second step of the present invention).

Then, by injecting a high energy ion beam 11 of 1 MeV or above of H, O, Ar, Xe, Kr, Au, etc. into the thin film core 9 through the mask 8, it is possible to transfer the two-dimensional cyclic structure of the mask 8 to the thin film core 9 (corresponding to the second step of the present invention).

This makes it possible to simultaneously create a plurality of types of photonic crystals having different two-dimensional cyclic structures in one thin film core 9 as a one-piece structure (this is referred to as a "composite cyclic structure" in the present Specification).

This has the effects of reducing the number of components and at the same time eliminating troublesome optical axis alignment as in the case of the conventional art.

As the material for the thin film core 8, this embodiment uses a dielectric such as glass and polymer having a refractive index of approximately 1.3 to 2.0.

Furthermore, as the two-dimensional cyclic structure of the through holes 2, the mask 8 has a grating constant a (14) approximately 0.54 times the wavelength on which each photonic crystal acts in directions of two fundamental grating vectors (a1, a2) having an internal angle θ (12) of approximately 80°.

Thus, the cyclic structure transferred to the thin film core 9 has a grating constant a (14) approximately 0.54 times the wavelength on which each photonic crystal acts in the direction of the same fundamental grating vector as that of the above described mask 8.

Since the refractive index of the through holes 2 is 1.0, a two-dimensional cyclic structure having a different refractive index (refractive index=1.0) is formed on the thin film core 9 whose refractive index is 1.3 to 2.0.

Furthermore, as the clad substrate 145, a dielectric such as glass and polymer having a refractive index of approximately 1.0 to 1.8 is used.

By the way, as the method of transferring the cyclic structure of the mask, electromagnetic waves can also be used in addition to an ion beam.

Thus, by using a mask having a plurality of cyclic structures and transferring the structure of the mask to the thin film core section of the slab type waveguide, a photonic crystal whose thin film core section has a plurality of cyclic structures is obtained and it is possible to form a photonic crystal of each cyclic structure corresponding to a plurality of waveforms such as WDM.

Second Embodiment

Figure 2:
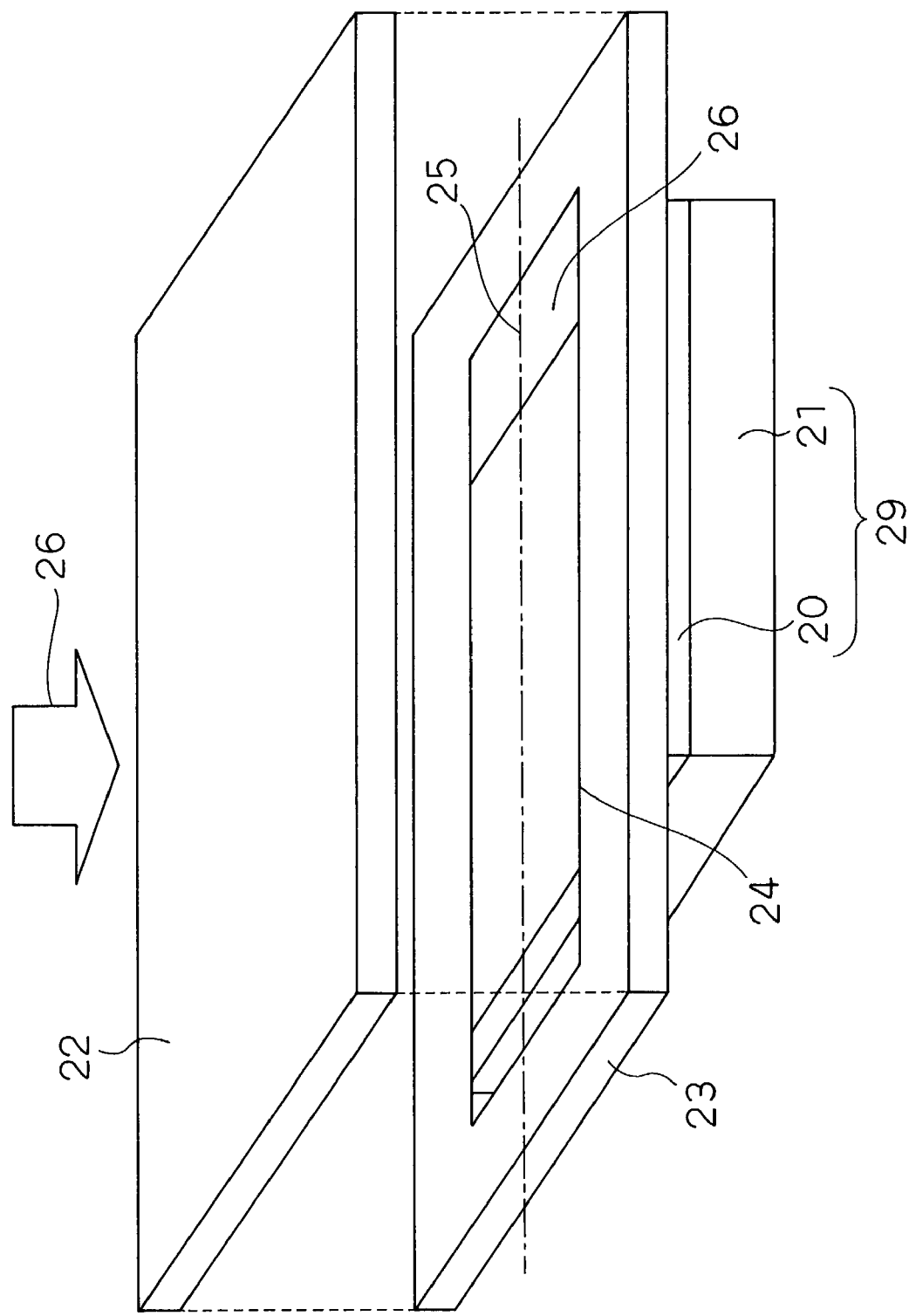
FIG. 2 is a schematic view of a photonic crystal which is a second embodiment of the present invention.

Then, with reference to FIG. 2, mainly an embodiment of a method of manufacturing a photonic crystal of the present invention will be explained. FIG. 2 is a schematic view of a configuration of the method of manufacturing a photonic crystal according to this embodiment.

The second embodiment of this method of manufacturing a photonic crystal is constructed using a slab type waveguide 29 composed of two layers of a thin film core 20 and a clad substrate 21, a mask 22 having a two-dimensional cyclic structure and a mask holder 23. By the way, a mask holder 23 is an example of a spacer of the present invention.

Here, the mask holder 23 keeps the space between the mask 22 and thin film core 20 constant, has a window 24 to allow the mask 22 to face the thin film core 20, and is used integrated with the mask 22.

In this Embodiment, just as with the above-described Embodiment 1, the cyclic structure of mask 22 is transferred to thin film core 20 by using the ion beam or electromagnetic wave.

The window 24 of the mask holder 23 is shaped in such a way that it is longer than the length of the waveguide of the slab type waveguide 29 with respect to the direction of the optical axis 25 of the slab type waveguide 29 and shorter than the width of the slab type waveguide 29 with respect to the direction perpendicular to the optical axis 25 within the plane of the thin film core 20.

Thus, having the window 24 which is oblong in the optical axis direction makes it possible to form a photonic crystal from the incident light side to the outgoing light side of the slab type waveguide 29, while reducing the width in the direction perpendicular to the optical axis makes it possible to form a fixed space between the mask 22 and thin film core 20, allowing a stable transfer.

Furthermore, using the mask holder 23 integrated with the mask 22 produces the following effect. That is, for example, even if the mask 22 is a thin film on the order of several μm, it can be easily handled by the operator or machine and the mask 22 can also be recycled. Furthermore, the mask 22 can also be integrated with the mask holder 23 and the above-described mask structure can be transferred to a plurality of optical waveguide films one after another by moving the integrated mask holder.

Third Embodiment

Then, with reference to mainly FIG. 3(A) to FIG. 3(C), an embodiment of the present invention will be explained.

FIG. 3(A) to FIG. 3(C) illustrate a method of manufacturing this photonic crystal and are schematic views to explain an outlined configuration of the method of manufacturing cylindrical holes formed by coupling many small spherical holes. FIG. 3(A) illustrates a state immediately after ion beam injection, FIG. 3(B) illustrates a state after soaking in NaOH and FIG. 3(C) illustrates a state when soaking in NaOH is completed.

The method of manufacturing a photonic crystal of this embodiment has the same configuration as that of the photonic crystal according to the above described first embodiment and is constructed in such a way as to form a photonic crystal by transferring the cyclic structure of the mask 8 to the thin film core 9 of the slab type waveguide 18 (see FIG. 1).

Here, the above described transfer method consists of using a polymer for the thin film core 9, accelerating ions such as H, O, Ar, Xe, Kr and Au to high energy of 1 MeV or above and injecting into the thin film core 9 of the slab type waveguide 18.

That is, trackings 30 whose polymer high molecular bond is cut along traces of injected ions are generated in the thin film core 9 (see FIG. 3(A)).

Then, when the thin film core 9 in which the trackings 30 are generated is soaked in an alkali aqueous solution such as NaOH, the trackings 30 are wet-etched and many holes 33 are generated (see FIG. 3(B)) and these holes grow as the etching time elapses (see FIG. 3(C)).

Ideally, the cross section of the hole can be round-shaped using a method of injecting one ion at a predetermined position and thereby forming the hole 35 in a desired size.

However, it is almost impossible to control the injection of one ion of the ion beam using the mask.

Figure 3:
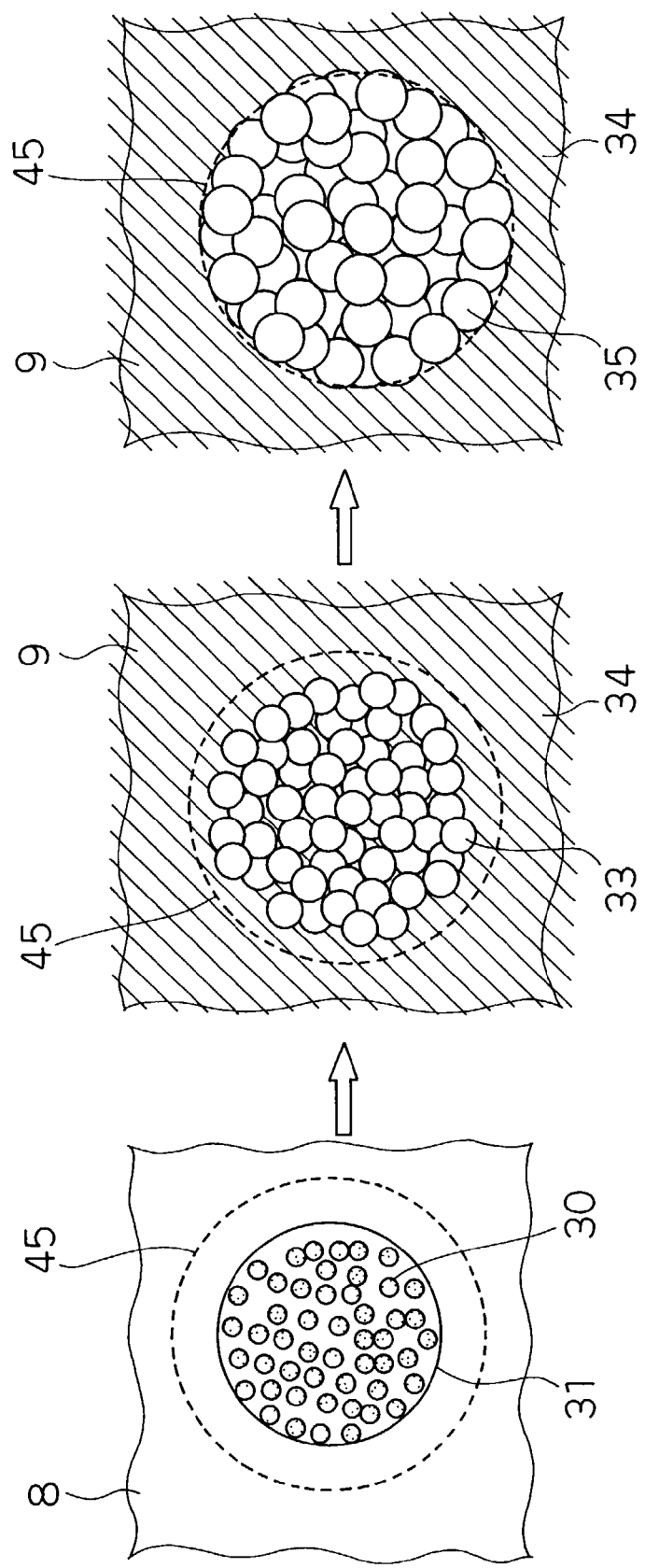
FIGS. 3(A) to 3(C) are schematic views of a method of forming multi-holes which is a third embodiment of the present invention.

Thus, as shown in FIG. 3, the size of the hole 31 of the mask 8 is made smaller than the desired size of the hole 45 to be formed in the polymer thin film core 9 and is reduced to, for example, approximately ½. Then, due to alkali wet etching of the tracking 30 generated along the edge of the hole 31 of the mask 8, the hole 33 grows to the hole 45 in the above desired size. In this way, the hole 45 in almost the desired size can be formed.

That is, a plurality of ions passing through the hole 31 of the mask 8 is injected into the polymer thin film core 9 of the slag type waveguide 18 and a plurality of trackings 30 is formed within a range smaller than the hole 45 of the desired size.

Then, when the polymer thin film core 9 with the plurality of trackings 30 is soaked in the alkali aqueous solution, a plurality of growing holes 33 is formed and neighboring holes are coupled to form larger holes. Then, when the holes at the outermost positions reach the edge of the hole 45 in the desired size, alkali soaking is completed.

This causes a plurality of grown holes 35 to couple with one another, the desired range of the hole 45 to be filled with the holes 35 which have grown from the trackings 30 as starting points, producing a hole almost the same as the desired hole 45.

A cross-sectional schematic view of the slab type waveguide 18 having the thin film core 9 of the photonic crystal manufactured in this way is shown in FIG. 11. The cross-section shown in FIG. 11 is the plane parallel to the optical axis, that is, the plane parallel to the direction of the first fundamental grating vector 5.

In FIG. 11, a region 101 has a cyclic structure that corresponds to the kth mask section 4 in FIG. 1 and a pitch 101$p$ between the holes 45 coincides with the grating constant a (14). Furthermore a region 102 has a cyclic structure corresponding to the (k+1)th mask section and a pitch 102$p$ between the holes 45 is a value different from the above grating constant a (14).

Thus, by controlling the range of injecting not one ion but a plurality of ions, it is possible to form one large hole as a result of coupling of a plurality of holes.

Furthermore, the slab type waveguide of the photonic crystal manufactured in this way also makes it possible to reduce the number of components as in the case of the above embodiment and has the effect of eliminating the need for troublesome optical axis alignment as in the case of the conventional art as well.

Fourth Embodiment

Then, with reference to FIG. 4, the method of manufacturing a mask according to the present invention will be explained.

Figure 4:
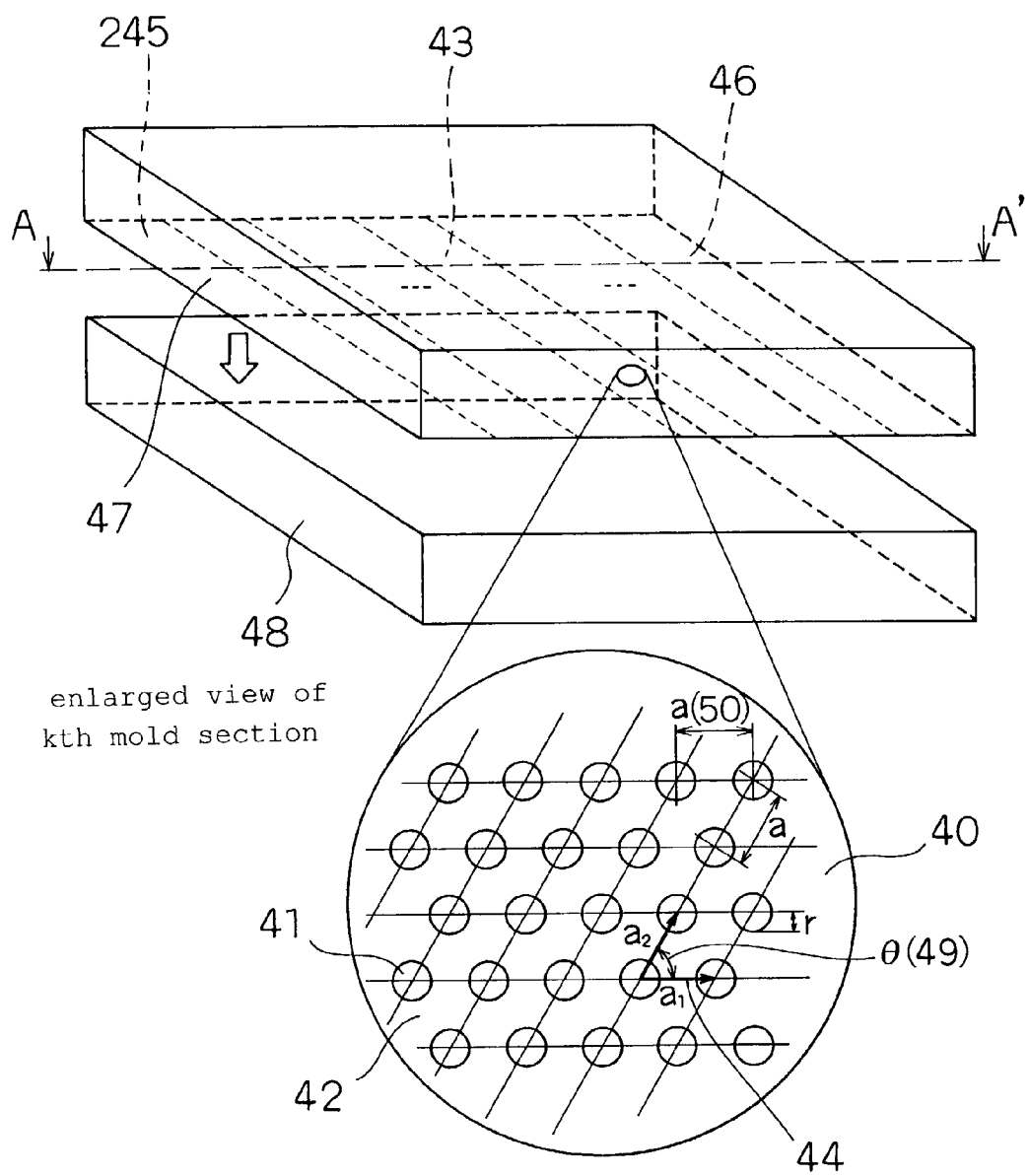
FIG. 4 is a schematic view of a method of manufacturing a mask for manufacturing a photonic crystal according to a fourth embodiment of the present invention.

FIG. 4 shows a schematic view of the method of manufacturing a mask for manufacturing a photonic crystal according to this embodiment.

The photonic crystal according to this embodiment has the same configuration as that of the photonic crystal in the above first embodiment.

According to the method of manufacturing a mask of this embodiment, a mold 47 is constituted by arranging a plurality of mold sections along the plane of a mold substrate 40. That is, the mold 47 has an array of n kth (k=1, 2, . . . , n) mold section 43 from a first mold section 245 to nth mold section 46 in a common first fundamental grating vector direction 44, each kth mold section 43 having the kth two-dimensional cyclic structure 42 with protrusions 41 cyclically arrayed along the plane of a mold substrate 40.

A mold 47 is constructed as a composite cyclic structure with the shape and cycle of the protrusions 41 of the two-dimensional cyclic structure of each mold section above varying from one mold section to another.

By the way, the above mold 47 corresponds to the mold means of the present invention.

In the above configuration, the plane of the protrusions 41 of the mold 47 is placed opposite to the mask substrate made of aluminum, etc. and pressed to create a concavo-convexo pattern on the surface of the mask substrate 48.

Figure 12:
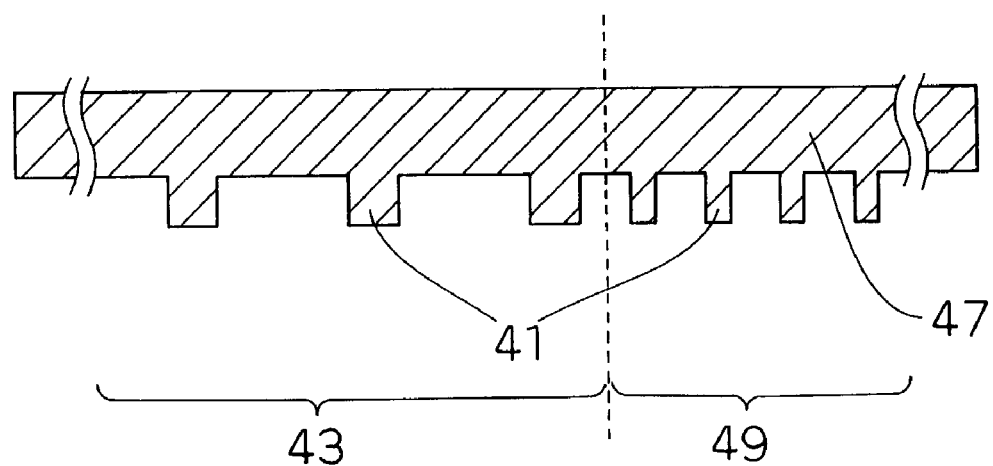
FIG. 12 is a cross-sectional schematic view showing an enlarged view of the cross sections of especially the kth mold section 43 and the (k+1)th mold section 49 of an A–A' section of the mold 47 shown in FIG. 4.
Figure 13:
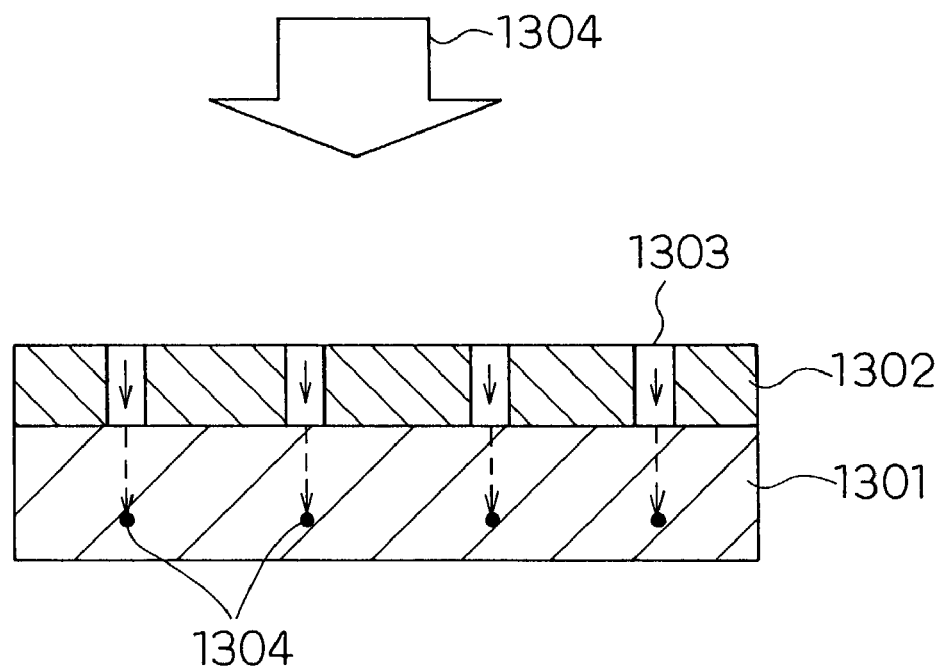
FIGS. 13(A) and 13(B) illustrate the method of manufacturing a mask substrate through ion injection according to the fifth embodiment.
Figure 13:
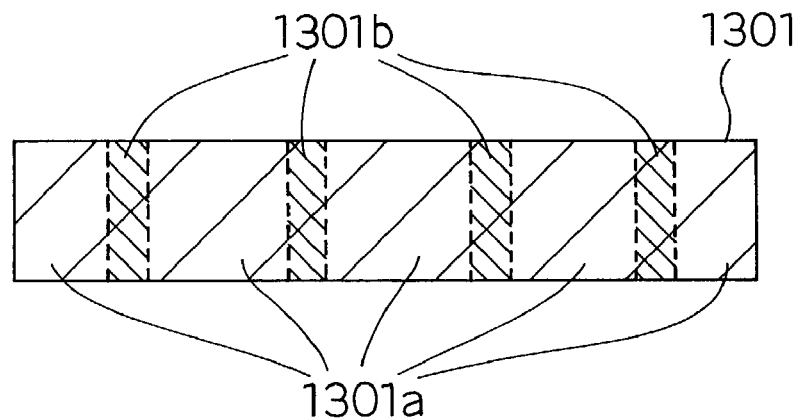
Figure 14:
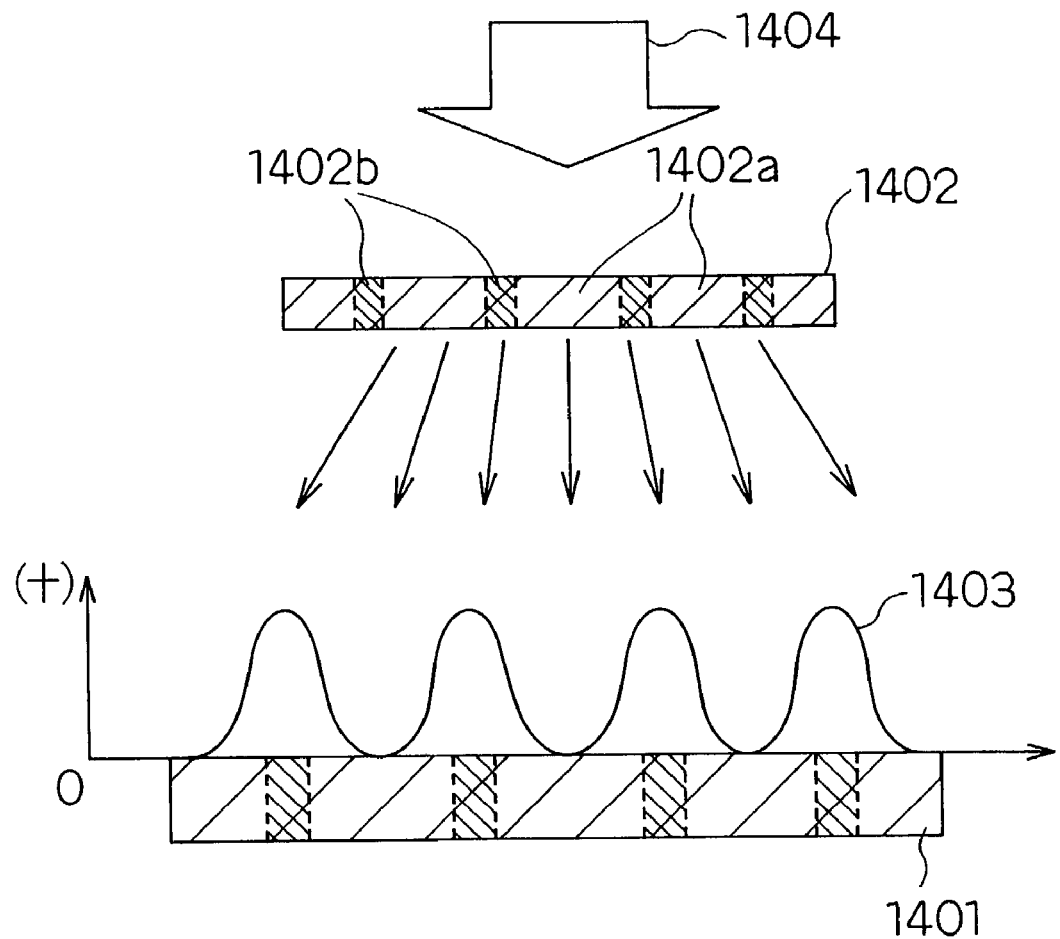
FIGS. 14(A) and 14(B) illustrate the method of manufacturing a mask substrate through electromagnetic interference according to the fifth embodiment.
Figure 14:
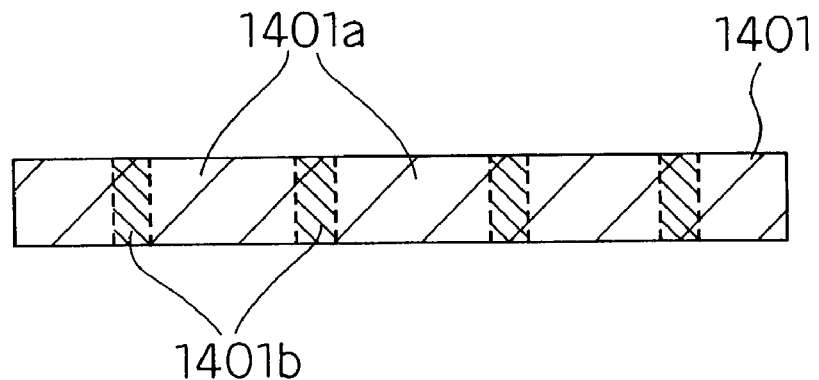

FIG. 12 is a cross-sectional enlarged view of the cross sections of the kth mold section 43 and the (k+1)th mold section in particular of the A–A' section of the mold 47 shown in FIG. 4.

Then, by applying anode oxidization to the above mask substrate 48 using oxalic acid, etc., the mask substrate 48 becomes a metal oxide mask substrate having a hole structure with the cyclic structure of the mold 47.

In this way, it is possible to form a structure in the mask substrate 48 in which a hole aggregate having the two-dimensional cyclic structure of the mold 47 is extended in the film thickness direction transformed into through holes.

This embodiment uses glass or metal, etc. as the material of the mold 47. Furthermore, as the two-dimensional cyclic structure of the protrusions 41, a grating constant a (50) whose size is approximately 0.54 times the wavelength on which each photonic crystal acts is provided in directions of two fundamental grating vectors (a1, a2) having an internal angle θ (49) of approximately 80°.

By the way, this embodiment has described the method of manufacturing through holes in the mask substrate by pressing the protrusions 41 of the mold 47 at predetermined positions of through holes on the mask substrate and applying anode oxidation using oxalic acid, etc., but the method is not limited to this and the following method is also available.

Figure 15:
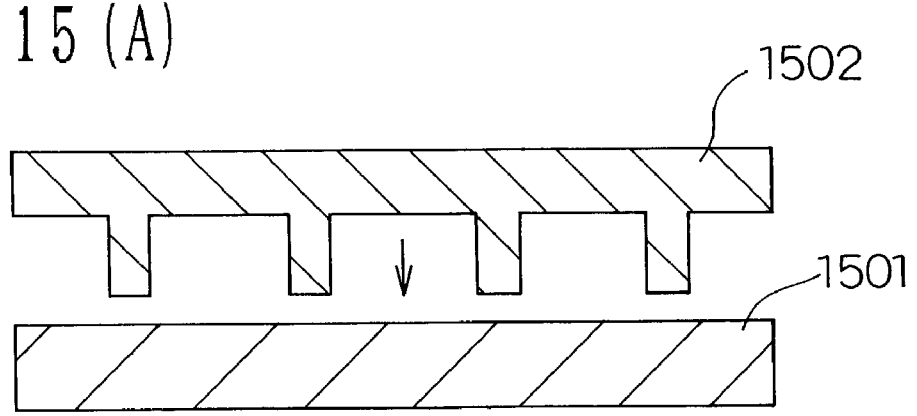
FIGS. 15(A) to 15(D) illustrate the method of manufacturing a mask substrate using a mold according to the fifth embodiment.
Figure 15:
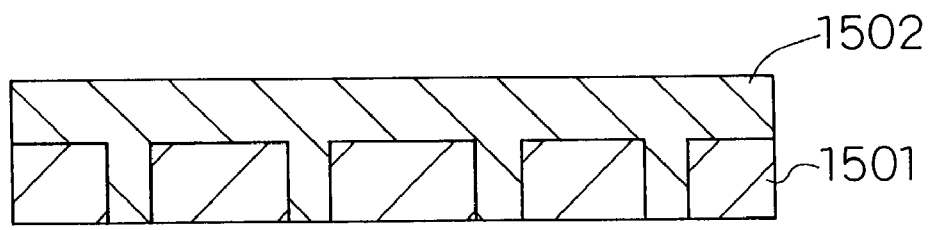
Figure 15:
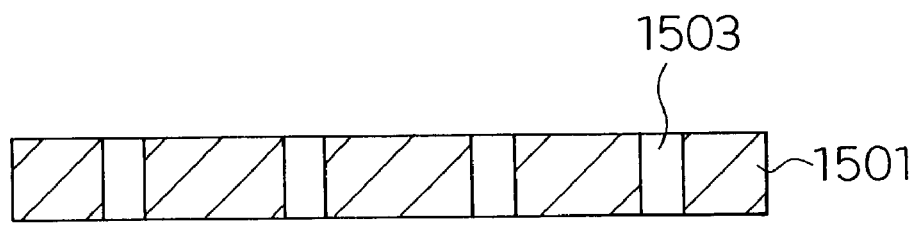
Figure 15:
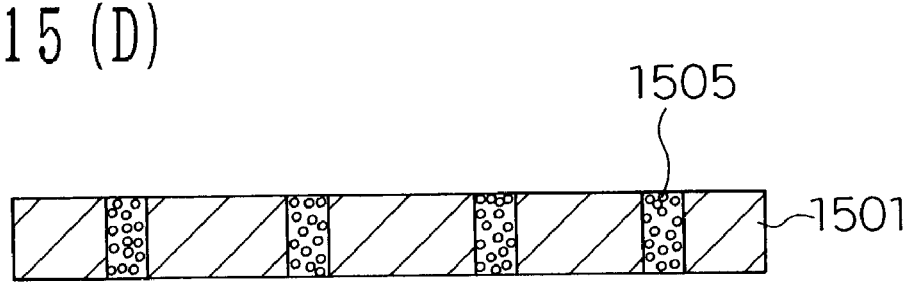

That is, there is also a method of manufacturing through holes all at once by pressing a mold having protrusions equal to or higher than the film thickness of the mask substrate against the mask substrate(see FIGS. 15(A) to 15(C)).

Another method is to irradiate ion beams or electron beams to desired positions of the mask substrate and apply dry etching. In this case, ion beams are irradiated onto only desired positions and therefore a mask for mask creation having through holes with a cyclic structure is used.

By the way, the height of the protrusion 41 is set to the mask thickness (1 to 100 μm) or less when post processing such as anode oxidation is applied as in the case of this embodiment and it is on the nano order of 1 μm or smaller. However, as described above, the height of the protrusion 41 is not limited to this, but when, for example, a mask is created only by pressing, the height of the protrusion is set to a height equal to or greater than the mask thickness.

Fifth Embodiment

Here, an embodiment of the method of manufacturing a photonic crystal of the present invention will be mainly explained with reference to FIG. 5.

Figure 5:
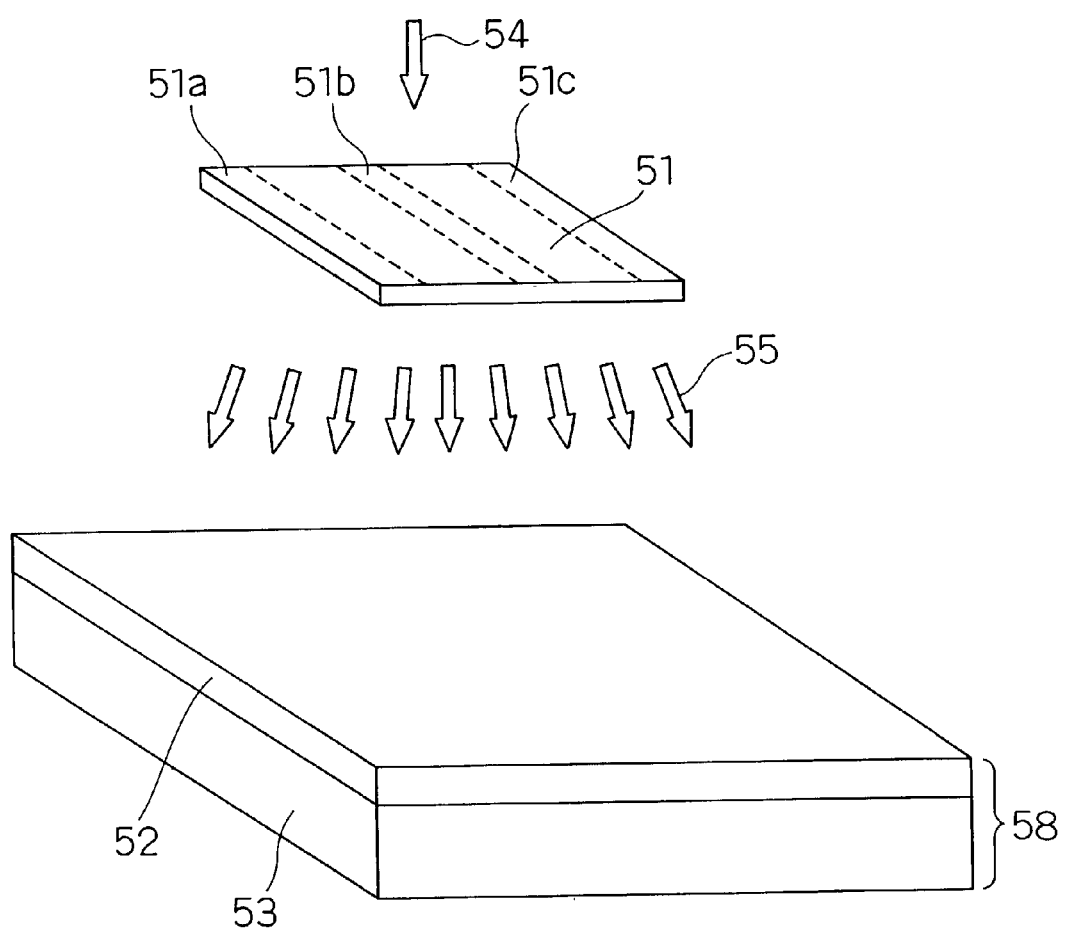
FIG. 5 is a schematic view of manufacturing a photonic crystal using laser which is a fifth embodiment of the present invention.

FIG. 5 is a schematic view of the method of manufacturing a photonic crystal of this embodiment.

As shown in FIG. 5, the method of manufacturing a photonic crystal of this embodiment uses as a mask a diffraction grating 51 on which two types of refractive indices are arrayed two-dimensionally and cyclically.

That is, a diffraction grating 51 is placed at a certain distance from a thin film core 52 of a slab type waveguide 58 having a two-layer structure of a thin film core 52 and clad substrate 53 and an electromagnetic wave 54 such as laser is irradiated onto the diffraction grating 51.

This produces differences in energy density on the thin film core 9 due to diffracted light 52 generated.

Because of these differences in energy density, areas of high energy density are etched and their refractive index changed (refractive index=1.0), while the refractive index of areas of low energy density is not changed (e.g., refractive index=1.3 to 2.0), and as a result a two-dimensional cyclic structure can be transferred to a thin film core 52.

According to this embodiment, the two-dimensional cyclic structure of the refractive index of the diffraction grating 51 provides an internal angle θ formed by two fundamental grating vectors of approximately 80°.

Furthermore, the photonic crystal manufactured using the diffraction grating 51 with the internal angle θ of approximately 80° demonstrates the following effect.

When the grating internal angle θ is set to 80°, only the wavelength corresponding to a combination between the grating constant, hole diameter and refractive index is polarized by approximately 7°, which makes it possible to extract only one out of a plurality of types of wavelength.

Furthermore, as the two-dimensional cyclic structure of the diffraction grating 51, it is also possible to use kth mask section 51b (k=1 to n) formed sequentially on the same substrate as a plurality of types of cyclic structure as in the case of the cyclic structure of the mask in the above first embodiment. By the way, in the figure, the first mask section is assigned reference numeral 51a and the nth mask section is assigned reference numeral 51c.

Using a diffraction grating in this way allows a plurality of types of cyclic structure (a composite cyclic structure) to be formed in a thin film core all at once. Thus, as in the case of the above described embodiment, the slab type waveguide of the photonic crystal manufactured in this way also has the effect of reducing the number of components and further eliminating troublesome optical axis alignment as with the prior art.

Then, using FIG. 13(A) to FIG. 15(D), three methods of manufacturing a mask of a diffraction grating used in this embodiment will be explained.

A first method is to inject ions 1304 at desired positions on the mask substrate 1301 where the refractive index should be changed as shown in FIG. 13(A) and FIG. 13(B) and make the refractive index at the injection positions higher than that at other positions. To inject ions 1304 only at desired positions, a mask 1302 for mask creation having through holes 1303 with a cyclic structure is used.

This causes the mask substrate 1301 to have a structure with high refractive index parts 1301b (e.g., refractive index≦1.505) arrayed cyclically and two-dimensionally amid the low refractive index part 1301a (e.g., refractive index≦1.500) of the mask substrate body.

For simplicity of drawings, FIG. 13(A) to FIG. 15(D) depict the mask substrate as having one type of two-dimensional cyclic structure. However, this two-dimensional cyclic structure varies from one region to another of the first mask section 51a to nth mask section 51c as described in FIG. 5. This is basically the same as the above-described embodiment explained using FIG. 4 and FIG. 12, etc.

However, the mask 51 which is a diffraction grating is similar to the mask described in the above embodiment 4, etc., but is different from the mask in the above embodiment in that it is smaller than the thin film core 52 in size (see FIG. 5). Moreover, in the case of the mask 51, electromagnetic waves penetrate not only the high refractive index areas but also the low refractive index areas.

As shown in FIG. 14(A) and FIG. 14(B), a second method is to allow areas with a high irradiation energy density due to interference among diffracted waves to be formed at desired positions on the mask substrate 1401 where the refractive index should be changed. This is intended to change the refractive index at desired positions to a higher refractive index than that at other positions.

In this way, a mask 1402 for mask creation is required to produce an irradiation energy density distribution on the mask substrate through interference among diffracted waves. This mask 1402 for mask creation is a diffraction grating having two types of refractive index arrayed two-dimensionally and cyclically; low refractive index section 1402a and high refractive index section 1402b.

In the above-described configuration, the mask 1402 for manufacturing a mask is placed at a certain distance from the mask substrate 1401 first and then an electromagnetic wave 1404 such as ultraviolet rays is irradiated onto the mask substrate 1401, which produces an irradiation electromagnetic energy density distribution on the mask substrate 1401 as described above, a variation in the refractive index is generated on the mask substrate 1401 according to the energy density distribution. In FIG. 14(B), these areas are indicated as low refractive index areas 1401a and high refractive index areas 1401b.

The mask 1402 for mask creation is created using the methods shown in, for example, FIG. 13(A) and FIG. 13(B), and FIG. 15A to FIG. 15D.

As shown in FIG. 15(A) to FIG. 15(D), a third method is to create through holes 1503 at desired positions on the mask substrate 1501 where the refractive index should be changed using a mold 1502 and those through holes are filled with a substance having a refractive index different from that of the mask substrate (e.g., high refractive index material 1505). This is intended to change the refractive index at desired positions only.

In FIG. 15(A) to FIG. 15(D), the case where through holes are created and filled with a substance as the structure of the mask substrate has been explained. However, the structure of the mask substrate is not limited to this and it is also possible, for example, to simply form depressions on the mask substrate cyclically using a mold.

This embodiment has described the mask 51 made up of a diffraction grating as having a structure with high refractive index areas and low refractive index areas cyclically arrayed, but this embodiment is not limited to this and can also have the mask structure as described in the above-described Embodiment 4. The mask in this case has a structure or is made of a substance that allows electromagnetic waves to pass through the areas corresponding to the high refractive index areas of the above-described mask and that prevents electromagnetic waves from passing through the areas corresponding to the above-described low refractive index areas. Those two areas constitute a two-dimensional cyclic structure. In this mask, just as with the above-described mask, when electromagnetic waves are irradiated onto the mask, an energy density distribution is produced on the surface of the thin film core 52 due to a diffraction effect based on the above-described two-dimensional cyclic structure. Here, the areas which electromagnetic waves can penetrate or pass through may be through holes or may be filled with a substance that allows electromagnetic waves to penetrate.

Sixth Embodiment

Here, an embodiment of an optical device of the present invention will be explained with reference to FIG. 6 and FIG. 7, etc.

Figure 6:
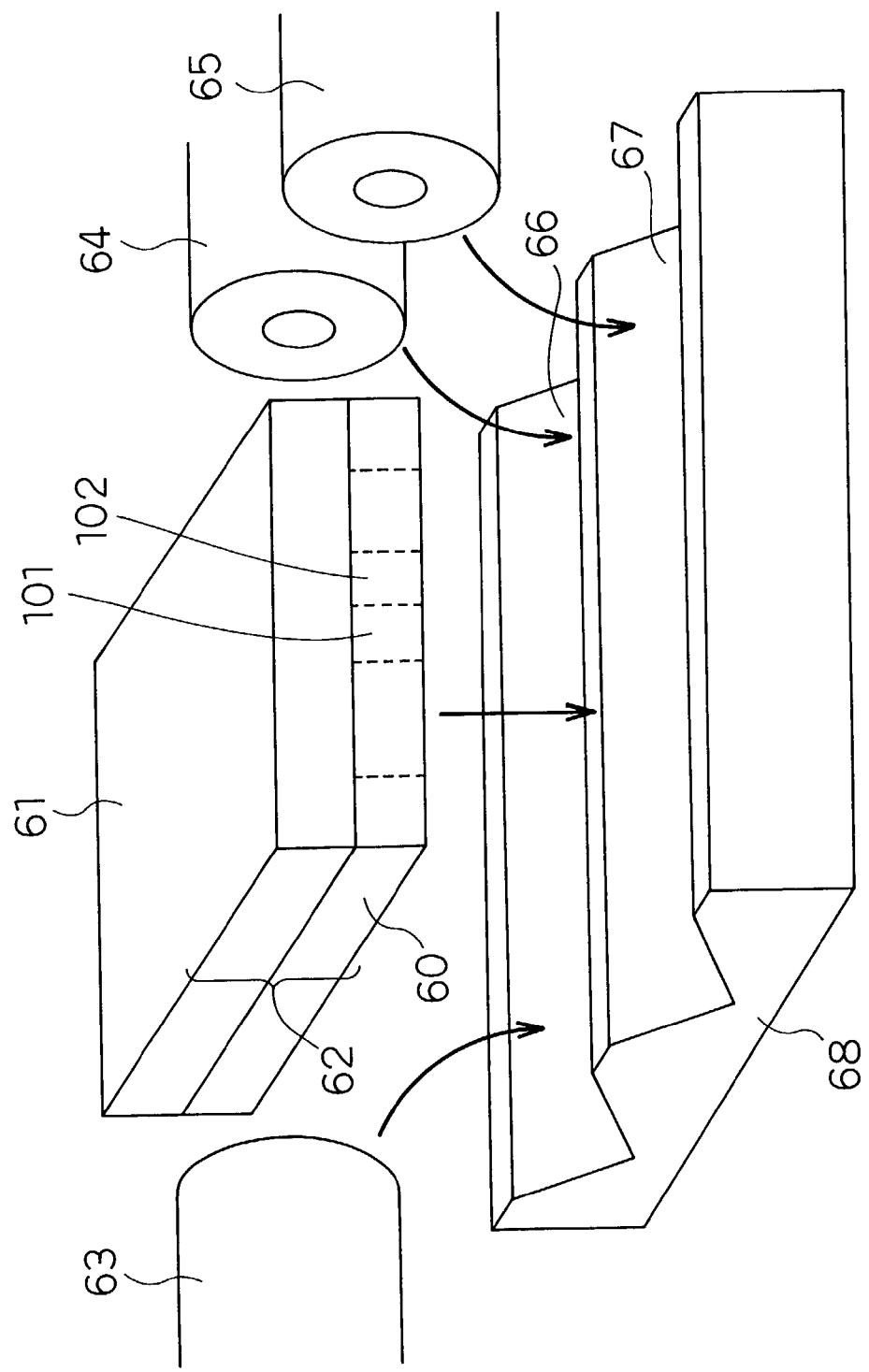
FIG. 6 is a schematic view of a device to which a photonic crystal according to a sixth embodiment of the present invention is applied.
Figure 7:
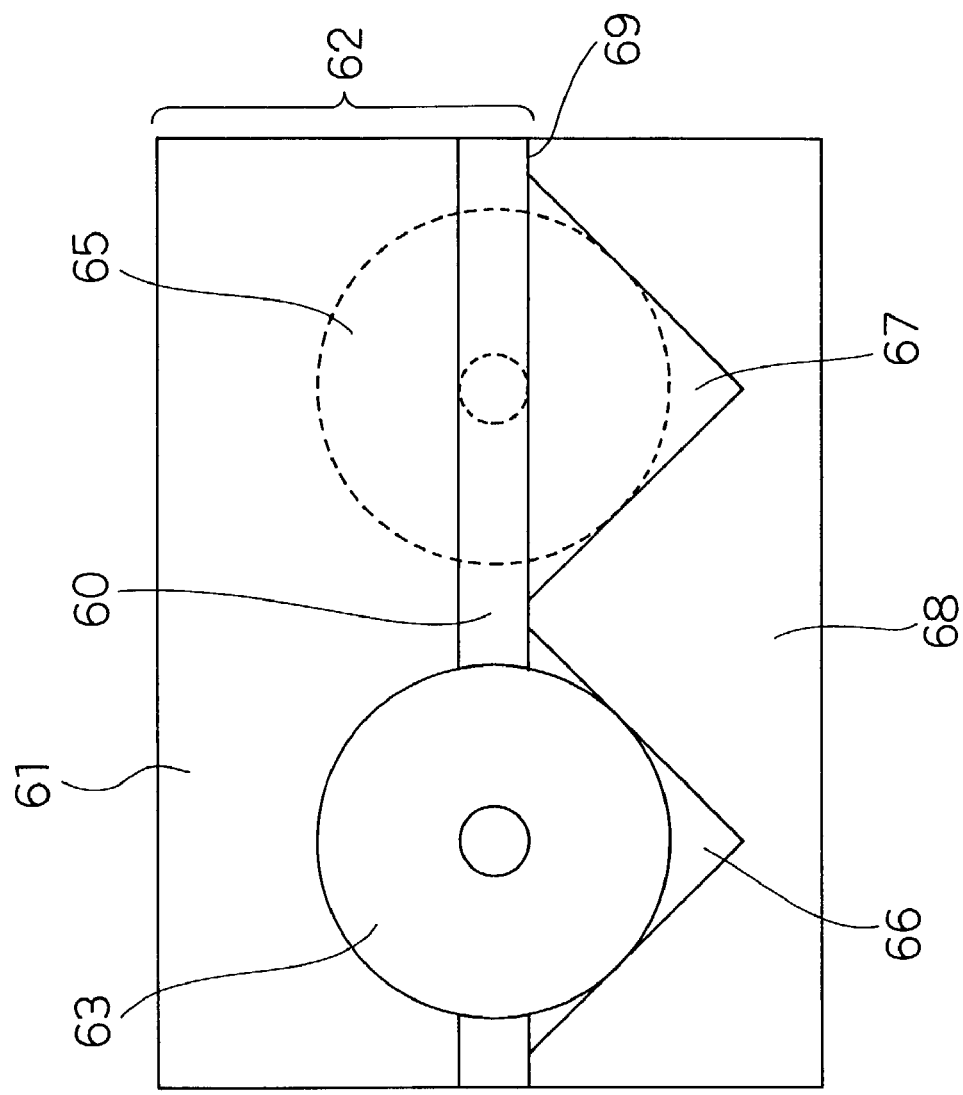
FIG. 7 is a cross-sectional schematic view of a device to which the photonic crystal according to the sixth embodiment of the present invention is applied.

FIG. 6 shows a schematic block diagram of an optical device according to this embodiment and FIG. 7 shows a cross-sectional view of this embodiment.

As shown in FIG. 6, the optical device according to this embodiment is constructed of a slab type photonic crystal waveguide 62 including a thin film core 60 having a cyclic structure and clad substrate 61, an input side optical fiber 63, a first output side optical fiber 64, a second output side optical fiber 65 and a V-grooved substrate 68 having a first V-groove 66 which shares the connection plane with the thin film core 60 of the above-described slab type photonic crystal and fixes the above-described input side optical fiber 63 and the first output side optical fiber 64 on the same optical axis and a second V-groove 67 which fixes the second output side optical fiber 65.

However, the first V-groove 66 and second V-groove 67 are so-called through V-grooves formed from one end to the other end on the V-grooved substrate 68 which is parallel to the slab type photonic crystal waveguide 62 and the first V-groove 66 and second V-groove 67 allow the input side optical fiber 63, the first output side optical fiber 64 and second output side optical fiber 65 to be aligned at a height where these can be optimally coupled with the thin film core 60 of the slab type photonic crystal waveguide 62 which shares the connection plane 69 with the V-grooved substrate. In FIG. 6, regions 101 and 102 have a cyclic structure corresponding to the kth and (k+1)th mask sections as explained in FIG. 11.

Forming a through-structured V-groove from the input side to the output side of the substrate improves the precision of the V-groove for adjustment of the optical axis of the input side optical fiber 63 and the first output side optical fiber 64 and adopting a through-structured V-groove facilitates machining of the V-groove on the substrate. Here, the through-structured V-groove means a groove having the same length as that of the substrate 68 with respect to the direction parallel to the optical axis as shown in FIG. 6.

Then, a relationship between a length $L_k$ of the photonic crystal of the kth region (k=1 to n) and a space d between the two output side optical fibers 64 and 65 will be explained using FIG. 16.

Figure 16:
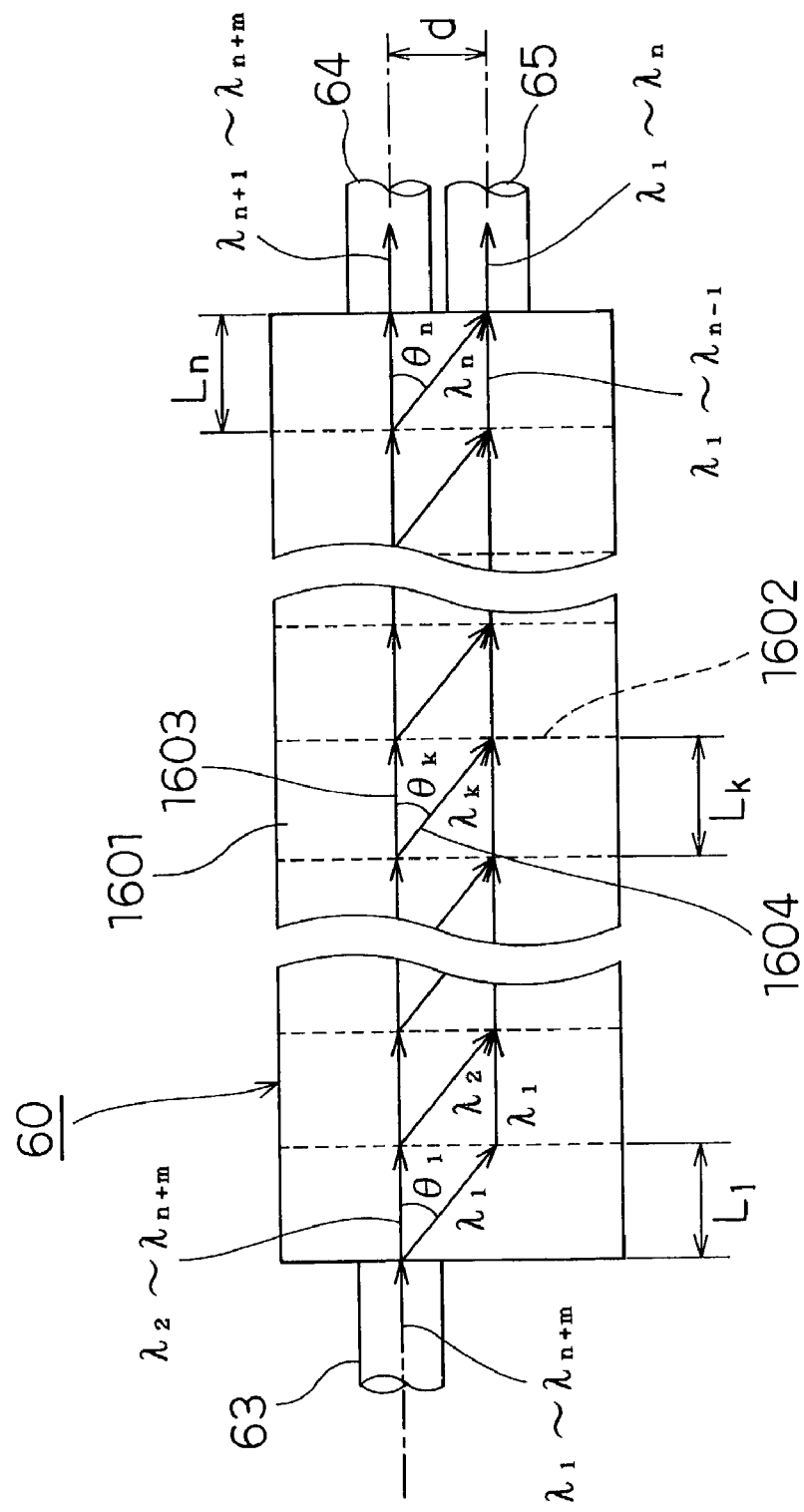
FIG. 16 is a schematic view for explaining the deflection of the wavelength due to the optical device shown in FIG. 6.

FIG. 16 shows a case where an optical signal having (n+m) types of wavelength ($\lambda_1$ to $\lambda_{n+m}$) is entered from the input side, divided into a group of $\lambda_{n+1}$ to $\lambda_{n+m}$ and a group of $\lambda_1$ to $\lambda_n$ and guided into the first output side optical fiber 64 and second output side optical fiber 65 respectively.

In a photonic crystal 1601 of the kth region formed in the thin film core 60, only a specific wavelength $\lambda_k$ is deflected by a certain angle $\theta$, while other wavelengths go straight forward in the optical axis direction.

A space d between non-deflected light 1603 and deflected light 1604 at the outgoing light side 1602 of the photonic crystal 1601 of the kth region is determined by the product of the length $L_k$ of the photonic crystal of the kth region and tan $\theta$.

Here, a length of a photonic crystal of other regions (e.g., $L_1$, $L_2$) and deflection angle (e.g., $\theta_1$, $\theta_2$) are set in such a way that the product of Li and tan $\theta_i$ (i=1 to n, i≠k) has the same value as d which has been obtained as shown above. Thus, the space between the first V-groove 66 and the second V-groove 67 is determined as a value proportional to the length of the photonic crystal 1601 of the kth region.

By the way, in order to extract only a specific wavelength for each photonic crystal of each region, an optical signal of the wavelength may be output, for example, from the lateral face of each region.

The above embodiment has described the case where a grating constant is approximately 0.54 times a wavelength specific to a two-dimensional photonic crystal, but the grating constant is not limited to this, and can be any value within a range of 0.4 to 0.6 times the wavelength.

The above embodiment has also mainly described the case where an angle formed by fundamental grating vectors is 80°, but the angle is not limited to this and can be any value within a range of 60 to 90°.

Figure 8:
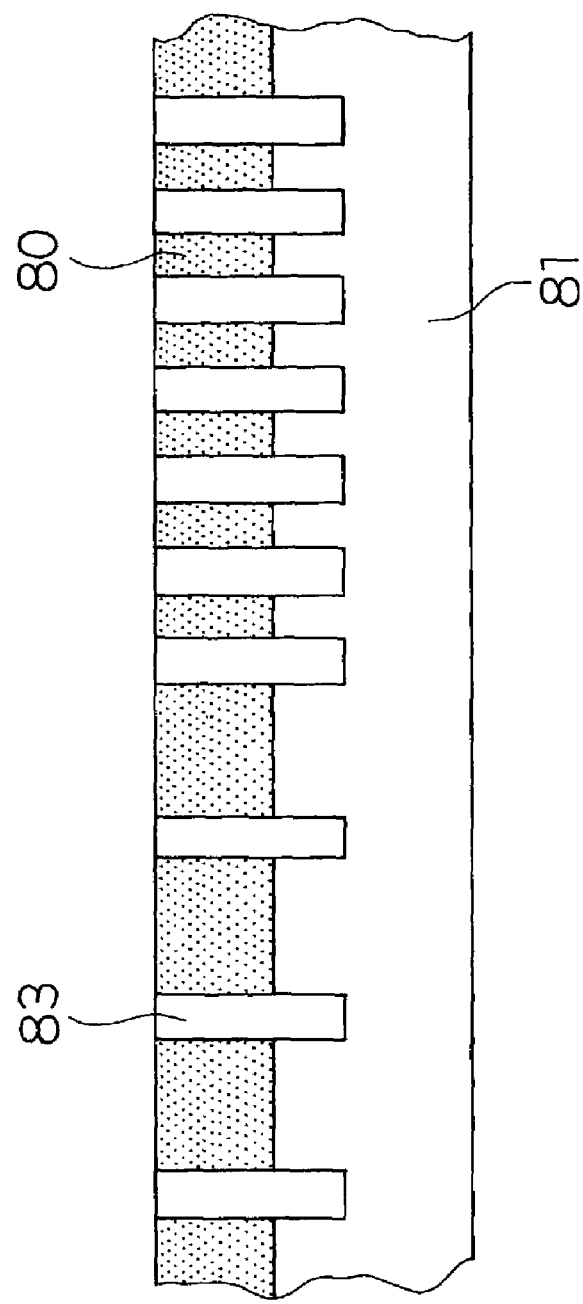
FIG. 8 illustrates depths of holes of the photonic crystal according to the first to sixth embodiments of the present invention.
Figure 9:
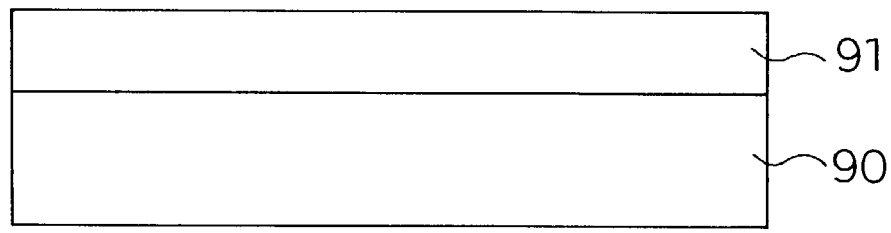
FIGS. 9(A) and 9(B) show a single cycle photonic crystal.
Figure 9:
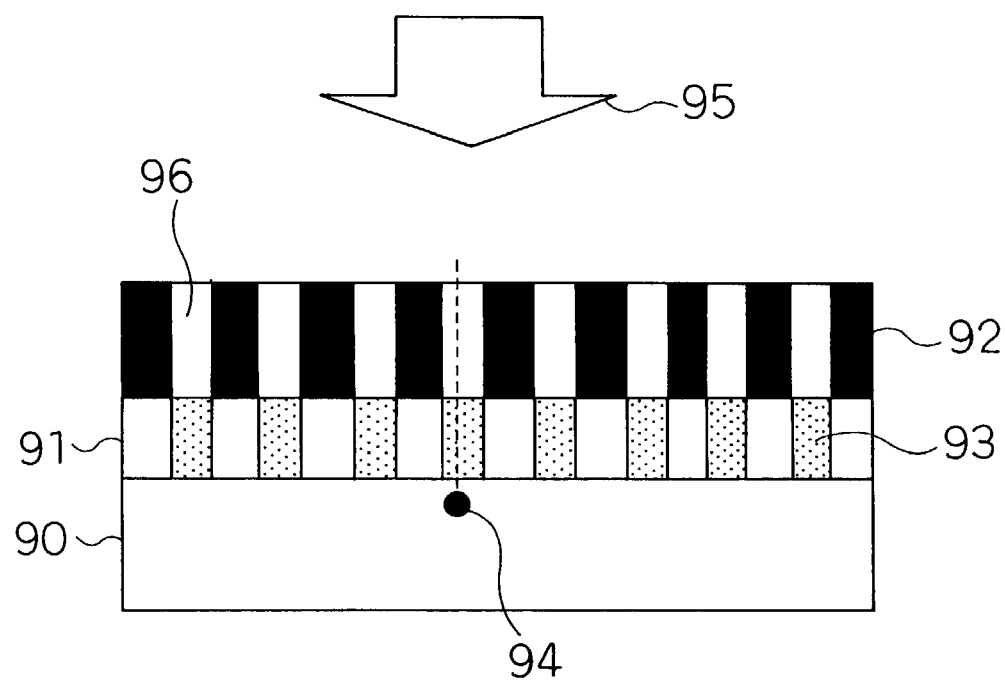

By the way, with respect to the depth of the photonic crystal described in the first to sixth embodiments, the hole 45 may only penetrate the area of the thin film core 9 of the slab type photonic crystal waveguide 18 as shown, for example, in FIG. 11 but the depth of the photonic crystal is not limited to this and the hole 83 may also penetrate the thin film core 80 into part of the clad substrate 81 as shown, for example, in FIG. 8. Furthermore, the hole 83 may also penetrate the clad substrate.

As is apparent from the above explanations, the above-described embodiment uses a mask having a plurality of cyclic structures, transfers the structure of the mask to the thin film core section of the slab type waveguide, which has the effect of creating a photonic crystal where the above-described thin film core section has a plurality of cyclic structures and forming a photonic crystal that acts on a plurality of wavelengths such as WDM.

As is apparent from the above-described explanations, the present invention has advantages of reducing the number of components and eliminating the need for troublesome alignment of the optical axis which would be required in the prior art.

What is claimed is:

1. A method of manufacturing a photonic crystal comprising the steps of:
    a first step of providing a predetermined film for which a plurality of photonic crystals, each having a different cyclic structure is manufactured; and
    a second step of irradiating predetermined particles or electromagnetic waves onto a mask having a plurality of regions, each region having passage sections arrayed based on a cyclic structure predetermined for each region, and a mask substrate to hold said passage sections,
    wherein said mask is constructed so that (a) when said particles are irradiated in said second step, said particles substantially pass through only said passage sections or (b) when said electromagnetic waves are irradiated in said second step, an energy density difference is produced on said film due to a diffraction effect based on said cyclic structure,
    the direction of said array corresponds to the direction of a fundamental grating vector of said photonic crystal,
    said plurality of regions are arranged to each correspond to a different one of the cyclic structures of said photonic crystals, and
    the direction corresponding to the direction of at least one said fundamental grating vector in said each region is consistent throughout all said regions.

2. The method of manufacturing a photonic crystal according to claim 1, wherein said passage sections are constructed of holes differing from said one region to another in at least one of cycle, size or shape.

3. The method of manufacturing a photonic crystal according to claim 1, wherein said film is a thin film for an optical waveguide,
    said second step is a step of using charged particles as said particles, and
    in said second step, said cyclic structure is transferred by injecting said charged particles that have passed through said passage sections into said thin film.

4. The method of manufacturing a photonic crystal according to claim 3, wherein size of the cross-section of said each passage section is such that a plurality of said charged particles can pass, the size of said passage section is smaller than size of the cross-section of a part which makes up the cyclic structure to be formed on said optical waveguide film, whose refractive index should be different from that of said optical waveguide film.

5. The method of manufacturing a photonic crystal according to claim 4, wherein the size of said cross-section of said passage section is ¼ of or greater than the size of the part which makes up the cyclic structure to be formed on said optical waveguide film, having a refractive index different from that of said optical waveguide film.

6. The method of manufacturing a photonic crystal according to claim 5, further comprising a step of soaking said optical waveguide film in an alkali aqueous solution after injecting charged particles in said optical waveguide,
    wherein said optical waveguide film is soaked in said alkali aqueous solution until the size of said each part which makes up said cyclic structure after the material change of said charged particle injected portion by the alkali aqueous solution substantially reaches the size of each part which makes up said cyclic structure to be formed on said optical wavelength film.

7. The method of manufacturing a photonic crystal according to claim 1, wherein said second step is a step of irradiating said electromagnetic waves,
    said film is a thin film for an optical waveguide,
    a refractive index of said passage sections is different from a refractive index of said mask substrate, and
    said energy density difference is produced as an intensity distribution of said energy density, whereby said cyclic structure is transferred to said thin film.

8. The method of manufacturing a photonic crystal according to claim 1, wherein said array in said each region is a two-dimensional array corresponding to a two-dimensional fundamental grating vector of said photonic crystal to be manufactured for said film and one of angles formed by the two directions of said array is 60 to 90°, and
    said passage sections differ from said one region to another in at least one of a grating constant, size or shape.

9. The method of manufacturing a photonic crystal according to claim 1, wherein said film is an optical waveguide film, and
    said method further comprises a third step of inserting a spacer between said mask and said waveguide film, said spacer for keeping a space between said mask and said optical waveguide film constant and having a window for exposing part of said mask and part of said optical waveguide film.

10. The method of manufacturing a photonic crystal according to claim 9, wherein said spacer is integrated with said mask and said mask structure is transferred to a plurality of said optical waveguide films one after another by moving said integrated spacer.

11. The method of manufacturing a photonic crystal according to claim 9, wherein the length of said optical waveguide film in the optical waveguide direction is shorter than the length of said mask window and the width of said optical waveguide film in a direction perpendicular to said optical waveguide direction within the plane of said optical waveguide film is greater than the width of said mask window.

12. The method of manufacturing a photonic crystal according to claim 1, wherein a grating constant of said each cyclic structure of said mask having a composite cyclic structure has a size 0.4 to 0.6 times the wavelength specific to said each cyclic structure.

13. A method of manufacturing an optical device using:
    a substrate having at least one through-structured V-groove in an optical axis direction;
    an optical waveguide film including a plurality of different photonic crystals, each having a different cyclic structure placed in such a way as to contact a plane with the V-groove of said substrate;
    at least one optical fiber on an incident light side fixed by means of said V-groove to said incident light side of said waveguide film provided with the incident light side and outgoing light side within a plane parallel to said substrate including the optical axis; and at least one optical fiber on the outgoing light side fixed to said outgoing light side, wherein said photonic crystal is manufactured by irradiating predetermined particles or electromagnetic waves onto a mask having a plurality of regions, each region having passage sections arrayed based on a cyclic structure predetermined for each region, and a mask substrate to hold said passage sections, the direction of said array corresponds to the direction of a fundamental grating vector of said photonic crystal, said plurality of regions are arranged to each correspond to a different one of the cyclic structures of said photonic crystals, and the direction corresponding to the direction of at least one said fundamental grating vectors in each said region is consistent throughout all said regions.

14. The method of manufacturing an optical device according to claim 13, wherein a spacing of said V-groove is determined in proportion to the length of said region of said photonic crystal.

15. The method of manufacturing an optical device according to claim 13 or 14, wherein the grating constant of said photonic crystal has a size 0.4 to 0.6 times the wavelength specific to a two-dimensional photonic crystal.

16. The method of manufacturing an optical device according to claim 15, wherein said photonic crystal is constructed of holes formed over a range from a thin film core section to a clad substrate making up said optical waveguide film and arrayed two-dimensionally and cyclically.

* * * * *